(12) United States Patent
Shimojo (10) Patent No.: US 11,909,344 B2
(45) Date of Patent: Feb. 20, 2024

(54) CONTROL DEVICE

(71) Applicant: SUBARU CORPORATION, Tokyo (JP)

(72) Inventor: Kazuma Shimojo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 106 days.

(21) Appl. No.: 17/306,027

(22) Filed: May 3, 2021

(65) Prior Publication Data

US 2021/0376780 A1 Dec. 2, 2021

(30) Foreign Application Priority Data

Jun. 2, 2020 (JP) ................................ 2020-096125

(51) Int. Cl.
*H02P 29/50* (2016.01)
*B60L 53/20* (2019.01)
*H02P 27/08* (2006.01)

(52) U.S. Cl.
CPC .............. *H02P 29/50* (2016.02); *B60L 53/20* (2019.02); *H02P 27/085* (2013.01)

(58) Field of Classification Search
CPC .................... B60L 15/08; B60L 53/20; G01N 2291/02827; G01N 2291/02854; G01N 2291/0289; G01N 2291/0425; G01N 2291/0427; G01N 2291/106; G01N 29/043; G01N 29/262; G01N 29/4472; G01N 29/46; H02P 27/085; H02P 29/50; Y02T 10/64; Y02T 10/70; Y02T 10/7072; Y02T 90/14

(Continued)

(56) References Cited

U.S. PATENT DOCUMENTS 10,461,699 B1 * 10/2019 Reja ...................... H03F 3/2173
2007/0025129 A1    2/2007 Garcia-Ortiz et al.
(Continued)

FOREIGN PATENT DOCUMENTS

CN     107342722 A  * 11/2017  ............ B60L 15/007
JP     H01-019976 A    1/1989
(Continued)

OTHER PUBLICATIONS

Notice of Reasons for Refusal received in Japanese Application No. 2020-096125, dated Oct. 31, 2023.

*Primary Examiner* — Kawing Chan
(74) *Attorney, Agent, or Firm* — Rimon P.C.; Tomoki Tanida (57) ABSTRACT

A control device includes a processor configured to control operation of an inverter by a synchronous pulse width modulation control using a pulse width modulation signal. The inverter is coupled to a motor. The pulse width modulation signal is generated by comparison of a carrier signal and a voltage command. In the synchronous pulse width modulation control, on the condition that resonance is caused, in a circuit including the inverter, by a particular harmonic component out of harmonic components to be generated in accordance with the pulse width modulation signal, the processor is configured to change the number of pulses of the carrier signal in one cycle of the voltage command, from the main number of pulses to the sub-number of pulses.

3 Claims, 8 Drawing Sheets

(58) Field of Classification Search
USPC .......................................................... 318/503
See application file for complete search history.

(56) References Cited

U.S. PATENT DOCUMENTS

2016/0072424 A1* 3/2016 Yokozutsumi ........ H02P 27/085
                                                                                                                  318/503
2018/0316298 A1* 11/2018 Yamada ................. H02P 27/085
2019/0238067 A1* 8/2019 Kondo .................. H02M 7/539
2020/0403548 A1* 12/2020 Hatakeyama ......... H02P 27/085

FOREIGN PATENT DOCUMENTS

| JP | H05-083802 A | | 4/1993 | |
|----|---|---|---|---|
| JP | 10-271835 A | | 10/1998 | |
| JP | 2012235619 A | * | 11/2012 | |
| JP | 5996031 B1 | * | 9/2016 | |
| JP | 2019-068493 A | | 4/2019 | |
| WO | WO-2018037454 A1 | * | 3/2018 | .............. H02P 27/08 |

* cited by examiner

CONTROL DEVICE

CROSS-REFERENCE TO RELATED APPLICATIONS

This application claims priority from Japanese Patent Application No. 2020-096125 filed on Jun. 2, 2020, the entire contents of which are hereby incorporated by reference.

BACKGROUND

The disclosure relates to a control device.

A pulse width modulation (PWM) control has been used as a control method of an inverter coupled to a motor. In the PWM control, a carrier signal and a voltage command are compared to generate a PWM signal. With the use of the PWM signal, operation of an inverter device is controlled. For example, reference is made to Japanese Unexamined Patent Application Publication (JP-A) No. H10-271835.

SUMMARY

An aspect of the technology provides a control device including a processor. The processor is configured to control operation of an inverter by a synchronous pulse width modulation control using a pulse width modulation signal. The inverter is coupled to a motor. The pulse width modulation signal is generated by comparison of a carrier signal and a voltage command. In the synchronous pulse width modulation control, on the condition that resonance is caused, in a circuit including the inverter, by a particular harmonic component out of harmonic components to be generated in accordance with the pulse width modulation signal, the processor is configured to change the number of pulses of the carrier signal in one cycle of the voltage command, from the main number of pulses to the sub-number of pulses.

An aspect of the technology provides a control device including circuitry. The circuitry is configured to control operation of an inverter by a synchronous pulse width modulation control using a pulse width modulation signal. The inverter is coupled to a motor. The pulse width modulation signal is generated by comparison of a carrier signal and a voltage command. In the synchronous pulse width modulation control, on the condition that resonance is caused, in a circuit including the inverter, by a particular harmonic component out of harmonic components to be generated in accordance with the pulse width modulation signal, the circuitry is configured to change the number of pulses of the carrier signal in one cycle of the voltage command, from the main number of pulses to the sub-number of pulses.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

A voltage waveform of a PWM signal corresponds to a voltage waveform to be applied to a motor. Thus, for some PWM signals, there arises, in a voltage to be applied to the motor, a frequency component that matches a resonance frequency of a circuit including an inverter. This may possibly cause resonance in the relevant circuit. Such resonance may constitute a cause of vibration or noise.

It is desirable to provide a control device that makes it possible to suppress resonance in a circuit including an inverter.

In the following, some preferred embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawing, elements having substantially the same function and configuration are denoted with the same reference characters to avoid redundant description, and elements not in direct relation to the technology may not be illustrated.

<Vehicle Configuration>

A configuration of a vehicle 1 according to an embodiment of the disclosure is described with reference to FIGS. 1 to 3.

The vehicle 1 is merely an example of a device on which a control device 80 according to an embodiment of the disclosure is mounted. For example, as described later, the control device 80 may be mounted on other vehicles than the vehicle 1, or alternatively, the control device 80 may be mounted on other devices than vehicles, e.g., moving bodies such as vessels, or power generation equipment.

Figure 1:
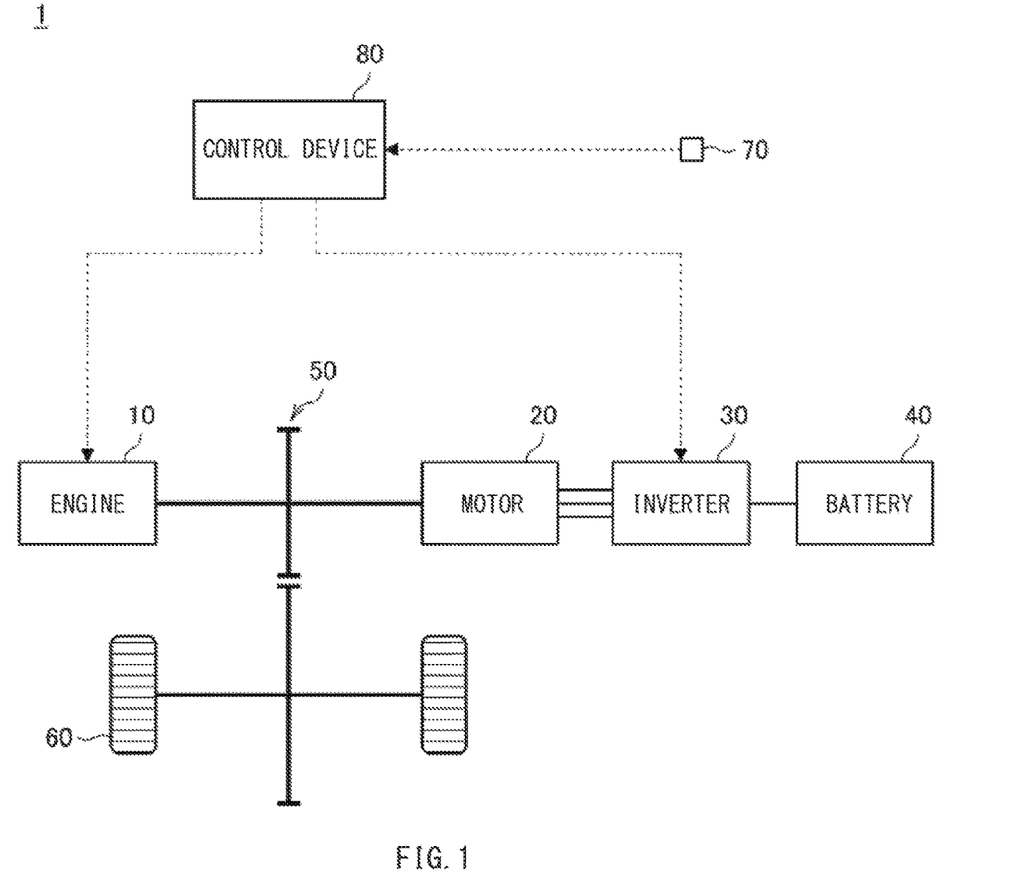
FIG. 1 schematically illustrates an overall configuration of a vehicle according to an embodiment of the disclosure.
Figure 2:
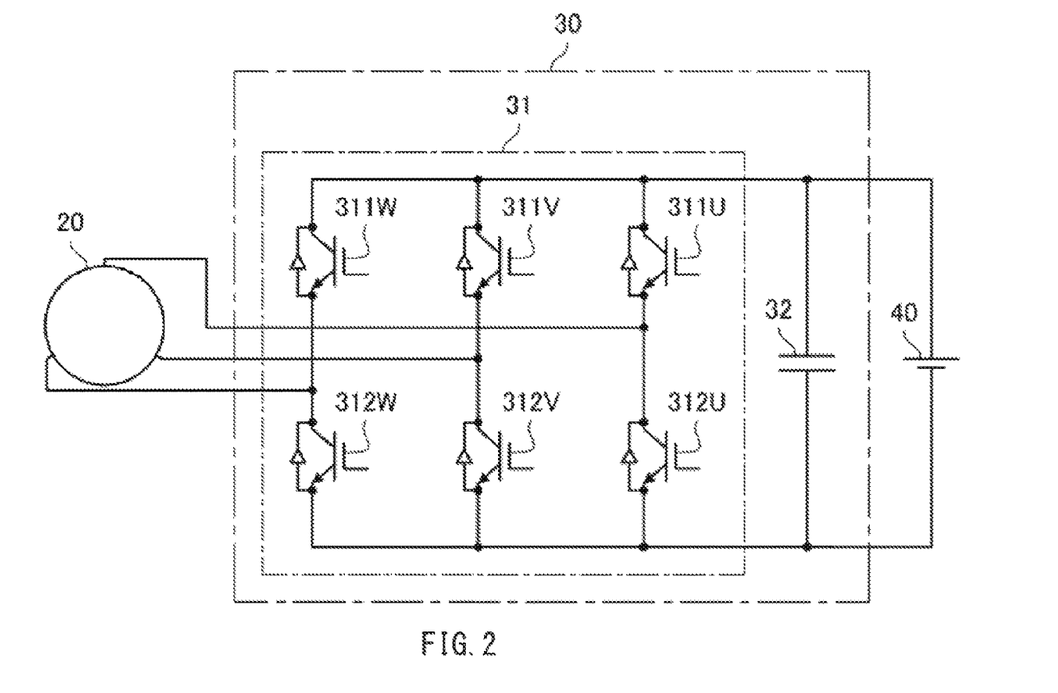
FIG. 2 is a circuit diagram of an example of an inverter according to the embodiment of the disclosure.

FIG. 1 schematically illustrates an overall configuration of the vehicle 1. As illustrated in FIG. 1, the vehicle 1 may be a hybrid vehicle including an engine 10 and a motor 20 as driving sources. Traveling modes of the vehicle 1 may be switched between, for example, an HV traveling mode and an EV traveling mode. The HV traveling mode includes allowing the vehicle 1 to travel with the use of motive power to be outputted from both the engine 10 and the motor 20. The EV traveling mode includes allowing the vehicle 1 to travel with the use of motive power to be outputted from the motor 20, with the engine 10 stopped.

The vehicle 1 may include the engine 10, the motor 20, an inverter 30, a battery 40, a power transmission system 50, drive wheels 60, a motor speed sensor 70, and the control device 80.

The vehicle 1 may include, as appropriate, other constituent elements than the constituent elements illustrated in FIG. 1. For example, between the engine 10 and the power transmission system 50, a power split mechanism, a forward and reverse switching mechanism, or a clutch, without limitation, may be provided. The power split mechanism may be coupled to a power generation motor. Illustration of these constituent elements is omitted for easier understanding.

The engine 10 may be an internal combustion engine that generates motive power with the use of, for example, gasoline as a fuel. The engine 10 may include a crankshaft that serves as an output shaft of the engine 10. The crankshaft may be coupled to input side of the power transmission system 50. Thus, motive power to be outputted from the engine 10 is transmitted to the drive wheels 60 through the power transmission system 50.

The motor 20 may be, for example, a three-phase AC motor. The motor 20 may be coupled to the battery 40 through the inverter 30. The motor 20 may be driven with the use of electric power of the battery 40, to output motive power. An output shaft of the motor 20 may be coupled to the input side of the power transmission system 50. Thus, motive power to be outputted from the motor 20 is transmitted to the drive wheels 60 through the power transmission system 50.

In one alternative, the motor 20 may be a motor generator configured to be regeneratively driven on the occasion of deceleration of the vehicle 1, to generate electric power by using kinetic energy of the drive wheels 60. In this case, electric power to be generated by the motor 20 may be supplied to the battery 40 through the inverter 30. This causes the battery 40 to be charged with electric power to be generated by the motor 20.

The inverter 30 may be an electric power conversion device configured to perform bidirectional electric power conversion. FIG. 2 is a circuit diagram of an example of the inverter 30. As illustrated in FIG. 2, the inverter 30 may include, for example, a three-phase bridge circuit 31 and a smoothing capacitor 32. The inverter 30 is configured to convert DC power supplied from the battery 40 into AC power, to supply AC power to the motor 20. Moreover, the inverter 30 is configured to convert AC power generated by the motor 20 into DC power, and supply DC power to the battery 40.

In one example, the electric power conversion by the inverter 30 may be carried out by controlling operation of switching elements 311U, 312U, 311V, 312V, 311W, and 312W provided in the three-phase bridge circuit 31. The switching elements 311U and 312U may be provided respectively on positive electrode side and negative electrode side in an arm circuit coupled to a U-phase coil of the motor 20 in the three-phase bridge circuit 31. The switching elements 311V and 312V may be provided respectively on positive electrode side and negative electrode side in an arm circuit coupled to a V-phase coil of the motor 20 in the three-phase bridge circuit 31. The switching elements 311W and 312W may be provided respectively on positive electrode side and negative electrode side in an arm circuit coupled to a W-phase coil of the motor 20 in the three-phase bridge circuit 31. Here, the inverter 30 is configured to control electric power to be supplied to the motor 20 by a PWM control, i.e., a pulse width modulation control. Details of a control of electric power supply in the PWM control are described later.

The battery 40 may be a battery configured to be charged with electric power and to discharge electric power. As the battery 40, for example, a lithium ion battery, a lithium ion polymer battery, a nickel metal hydride battery, a nickel cadmium battery, or a lead-acid battery may be used, but other batteries than exemplified above may be used. The battery 40 may accumulate electric power to be supplied to the motor 20.

As illustrated in FIG. 1, output side of the power transmission system 50 may be coupled to an axle of each of the drive wheels 60. Thus, motive power to be outputted from the engine 10 or the motor 20 is transmitted to the drive wheels 60 through the power transmission system 50 and the axles. For example, the power transmission system 50 may include a transmission such as a CVT (Continuously Variable Transmission). Thus, motive power to be outputted from the engine 10 or the motor 20 is subjected to shifting in the power transmission system 50 and transmitted to the drive wheels 60.

In the vehicle 1, motive power to be outputted from the drive sources, i.e., the engine 10 or the motor 20, is transmitted to the drive wheels 60. The drive wheels 60 may be front wheels, or alternatively, the drive wheels 60 may be rear wheels. Moreover, motive power to be outputted from the output side of the power transmission system 50 may be transmitted to both the front wheels and the rear wheels through an unillustrated propeller shaft.

The motor speed sensor 70 may detect a motor speed, i.e., the number of revolutions of the motor 20, and output the motor speed to the control device 80.

The control device 80 may include, for example, a CPU (Central Processing Unit), a ROM (Read Only Memory), and a RAM (Random Access Memory). The CPU may serve as a calculation processing unit. The ROM may serve as a storage that holds programs and calculation parameters to be used by the CPU. The RAM may serve as a storage that temporarily holds, for example, parameters that change appropriately in the execution of the programs by the CPU.

Figure 3:
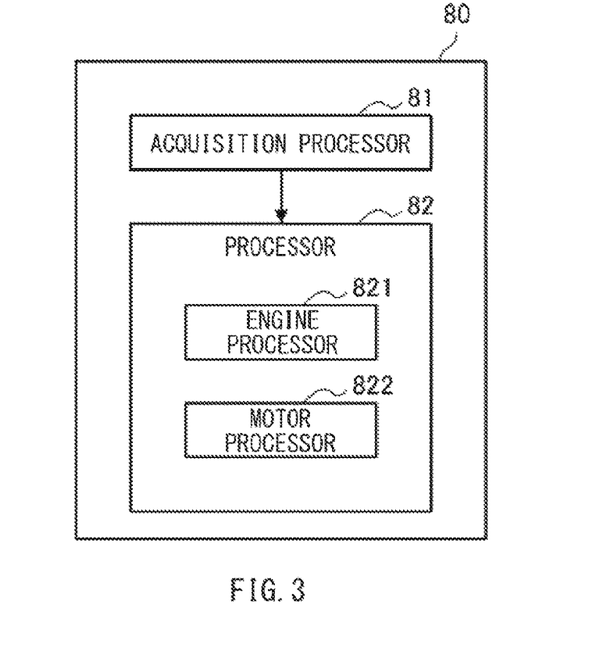
FIG. 3 is a block diagram of an example of a configuration of a control device according to the embodiment of the disclosure.

FIG. 3 is a block diagram of an example of a configuration of the control device 80. As illustrated in FIG. 3, the control device 80 may include, for example, an acquisition processor 81 and a processor 82.

The acquisition processor 81 may acquire various kinds of data for use in the processing to be performed by the processor 82. The acquisition processor 81 may output the acquired data to the processor 82. For example, the acquisition processor 81 may acquire data to be outputted from the motor speed sensor 70.

The processor 82 may control operation of each device in the vehicle 1. For example, the processor 82 may include an engine processor 821 and a motor processor 822.

The engine processor 821 may control operation of the engine 10. In one example, the engine processor 821 may control operation of each device in the engine 10, and thereby control a throttle plate position, ignition timing, and an amount of fuel injection, without limitation. This makes it possible for the engine processor 821 to control an output of the engine 10.

The motor processor 822 may control operation of the motor 20. In one example, the motor processor 822 may control the operation of the switching elements 311U, 312U, 311V, 312V, 311W, and 312W of the inverter 30, and thereby control electric power supply between the battery 40 and the motor 20. This makes it possible for the motor processor 822 to control motive power generation and electric power generation by the motor 20.

The motor processor 822 may control operation of the inverter 30 by the PWM control. In one example, in the PWM control, the motor processor 822 may generate a carrier signal and a voltage command, and compare the carrier signal and the voltage command to generate a PWM signal. With the use of the PWM signal, the motor processor 822 may control the operation of the inverter 30.

As described above, the control device 80 may communicate with each device mounted on the vehicle 1. Communication between the control device 80 and each device may be established using, for example, CAN (Controller Area Network) communication.

Processors of the control device 80 according to this embodiment may be distributed over a plurality of control devices, or alternatively, a plurality of processors may constitute a single control device. In the case where the processors of the control device 80 are distributed over a plurality of control devices, the plurality of the control devices may be coupled to one another through a communication bus such as CAN.

As described above, the processor 82 of the control device 80, e.g., the motor processor 822, may control the operation of the inverter 30 by the PWM control using the PWM signal. In one example, the processor 82 is configured to control the operation of the inverter 30 by a synchronous PWM control. The synchronous PWM control is a PWM control in which a frequency of the carrier signal becomes an integer multiple of a frequency of the voltage command.

It is to be noted that a PWM control in which the frequency of the carrier signal does not become an integral multiple of the frequency of the voltage command is called an asynchronous PWM control. For example, the processor 82 may perform the asynchronous PWM control in a case where the motor speed is equal to or lower than a predetermined speed, and perform the synchronous PWM control in a case where the motor speed is higher than the predetermined speed.

In this embodiment, in the synchronous PWM control, devising a control of the number of pulses of the carrier signal in one cycle of the voltage command makes it possible to suppress resonance in a circuit including the inverter 30. Details of such processing related to the control of the number of pulses of the carrier signal to be performed by the processor 82 of the control device 80 are described later.

<Operation of Control Device>

Referring to FIGS. 4 to 15, description is given of operation of the control device 80 according to the embodiment of the disclosure.

As mentioned above, the processor 82 is configured to control the operation of the inverter 30 by the synchronous PWM control. In the synchronous PWM control, the frequency of the carrier signal becomes an integer multiple of the frequency of the voltage command. Here, in the synchronous PWM control, harmonic components are generated in accordance with the PWM signal. A harmonic component is a frequency component having a frequency of an integer multiple of a frequency of a fundamental wave of a voltage waveform to be applied to the motor 20. The fundamental wave is a frequency component that matches the frequency of the voltage command. A harmonic component a frequency of which is N times the frequency of the fundamental wave is referred to as an N-th harmonic component. The harmonic components to be generated in accordance with the PWM signal vary with the number of pulses of the carrier signal in one cycle of the voltage command. Hereinafter, the number of pulses of the carrier signal in one cycle of the voltage command is also simply referred to as the number of pulses of the carrier signal.

The inventor, focusing on the variation in the harmonic components to be generated with the number of pulses of the carrier signal, has devised how to control the number of pulses of the carrier signal, to suppress resonance in the circuit including the inverter 30. In the following, prior to detailed description of processing regarding how the processor 82 controls the number of pulses of the carrier signal, description is given as to how the harmonic components vary with the number of pulses of the carrier signal, with reference to FIGS. 4 to 11.

Figure 4:
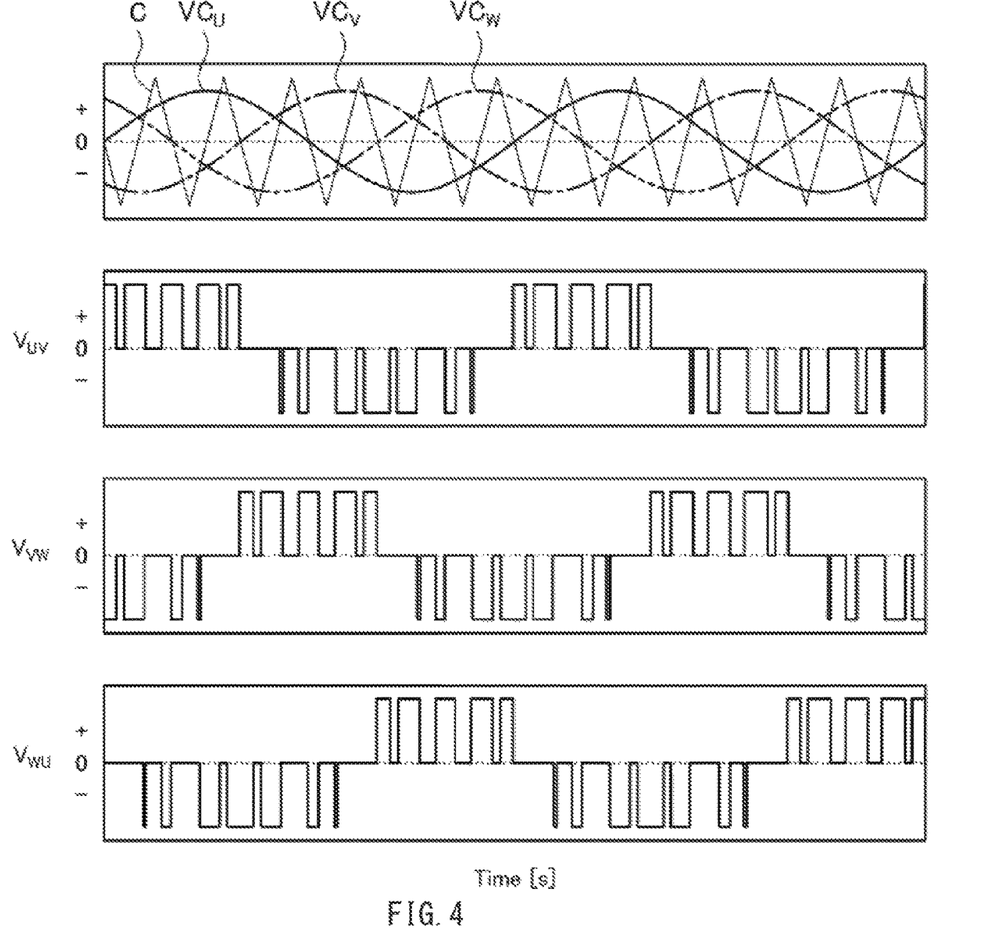
FIG. 4 illustrates a PWM signal that defines phase-to-phase voltages in a case where the number of pulses of a carrier signal of the inverter according to the embodiment of the disclosure is six (6).

FIG. 4 illustrates the PWM signal defining phase-to-phase voltages $V_{UV}$, $V_{VW}$, and $V_{WU}$ in a case where the number of pulses of a carrier signal C of the inverter 30 is six (6). As illustrated in FIG. 4, the processor 82 may compare the carrier signal C to the voltage commands $VC_U$, $VC_V$, and $VC_W$, to generate the PWM signal defining the phase-to-phase voltages $V_{UV}$, $V_{VW}$, and $V_{WU}$. The carrier signal C is a triangular wave. The voltage commands $VC_U$, $VC_V$, and $VC_W$ are sine waves.

Phases of the voltage commands $VC_U$, $VC_V$, and $VC_W$ are shifted by 120°. In the following, a frequency of each of the voltage commands $VC_U$, $VC_V$, and $VC_W$ is also simply referred to as the frequency of the voltage command. It is to be noted that in FIG. 4, at timing when the voltage command $VC_U$ becomes zero (0) on a rise, the carrier signal C becomes zero (0), at which timing the carrier signal C is on a fall. However, the phase shift between the carrier signal C and each of the voltage commands is not particularly limited to the example of FIG. 4.

The phase-to-phase voltage $V_{UV}$ is a difference between a U-phase voltage and a V-phase voltage of the motor 20. In one example, the phase-to-phase voltage $V_{UV}$ is a U-phase relative voltage to the V-phase voltage as a reference. The phase-to-phase voltage $V_{UV}$ may be determined, for example, as follows. For example, in a case where the voltage command $VC_U$ is higher than the carrier signal C, the U-phase voltage is assumed to be one (1). In a case where the voltage command $VC_U$ is lower than the carrier signal C, the U-phase voltage is assumed to be zero (0). In a case where the voltage command $VC_V$ is higher than the carrier signal C, the V-phase voltage is assumed to be one (1). In a case where the voltage command $VC_V$ is lower than the carrier signal C, the V-phase voltage is assumed to be zero (0). At each timing, the U-phase voltage and the V-phase voltage are determined as mentioned above, and a value obtained by subtracting the V-phase voltage from the U-phase voltage is determined as the phase-to-phase voltage $V_{UV}$.

The phase-to-phase voltage $V_{VW}$ is a difference between the V-phase voltage and a W-phase voltage of the motor 20. In one example, the phase-to-phase voltage $V_{VW}$ is a V-phase relative voltage to the W-phase voltage as a reference. The phase-to-phase voltage $V_{VW}$ may be determined, for example, as follows. For example, in a case where the voltage command $VC_V$ is higher than the carrier signal C, the V-phase voltage is assumed to be one (1). In a case where the voltage command $VC_V$ is lower than the carrier signal C, the V-phase voltage is assumed to be zero (0). In a case where the voltage command $VC_W$ is higher than the carrier signal C, the W-phase voltage is assumed to be one (1). In a case where the voltage command $VC_W$ is lower than the carrier signal C, the W-phase voltage is assumed to be zero (0). At each timing, the V-phase voltage and the W-phase voltage are determined as mentioned above, and a value obtained by subtracting the W-phase voltage from the V-phase voltage is determined as the phase-to-phase voltage $V_{VW}$.

The phase-to-phase voltage $V_{WU}$ is a difference between the W-phase voltage and the U-phase voltage of the motor 20. In one example, the phase-to-phase voltage $V_{WU}$ is a W-phase relative voltage to the U-phase voltage as a reference. The phase-to-phase voltage $V_{WU}$ may be determined, for example, as follows. For example, in a case where the voltage command $VC_W$ is higher than the carrier signal C, the W-phase voltage is assumed to be one (1). In a case where the voltage command $VC_W$ is lower than the carrier signal C, the W-phase voltage is assumed to be zero (0). In a case where the voltage command $VC_U$ is higher than the carrier signal C, the U-phase voltage is assumed to be one (1). In a case where the voltage command $VC_U$ is lower than the carrier signal C, the U-phase voltage is assumed to be zero (0). At each timing, the W-phase voltage and the U-phase voltage are determined as mentioned above, and a value obtained by subtracting the U-phase voltage from the W-phase voltage is determined as the phase-to-phase voltage $V_{WU}$.

Figure 5:
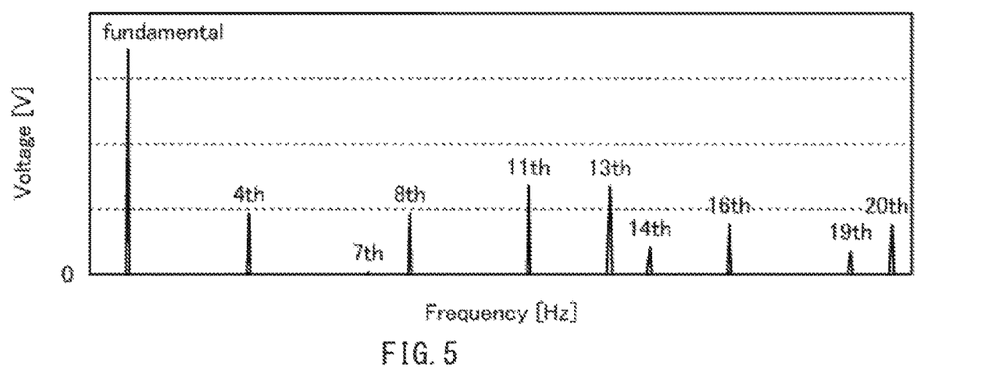
FIG. 5 illustrates harmonic components to be generated in the case where the number of pulses of the carrier signal of the inverter according to the embodiment of the disclosure is 6.

FIG. 5 illustrates harmonic components to be generated in a case where the number of pulses of the carrier signal C of the inverter 30 is 6. For example, FIG. 5 illustrates harmonic components to be generated in accordance with the PWM signal illustrated in FIG. 4. As illustrated in FIG. 5, in the case where the number of pulses of the carrier signal C is 6, there occurs, in the voltage to be applied to the motor 20, in addition to the fundamental wave ("fundamental" in FIG. 5), a 4th harmonic component, a 7th harmonic component, an 8th harmonic component, an 11th harmonic component, a 13th harmonic component, a 14th harmonic component, a 16th harmonic component, a 19th harmonic component, and a 20th harmonic component.

Figure 6:
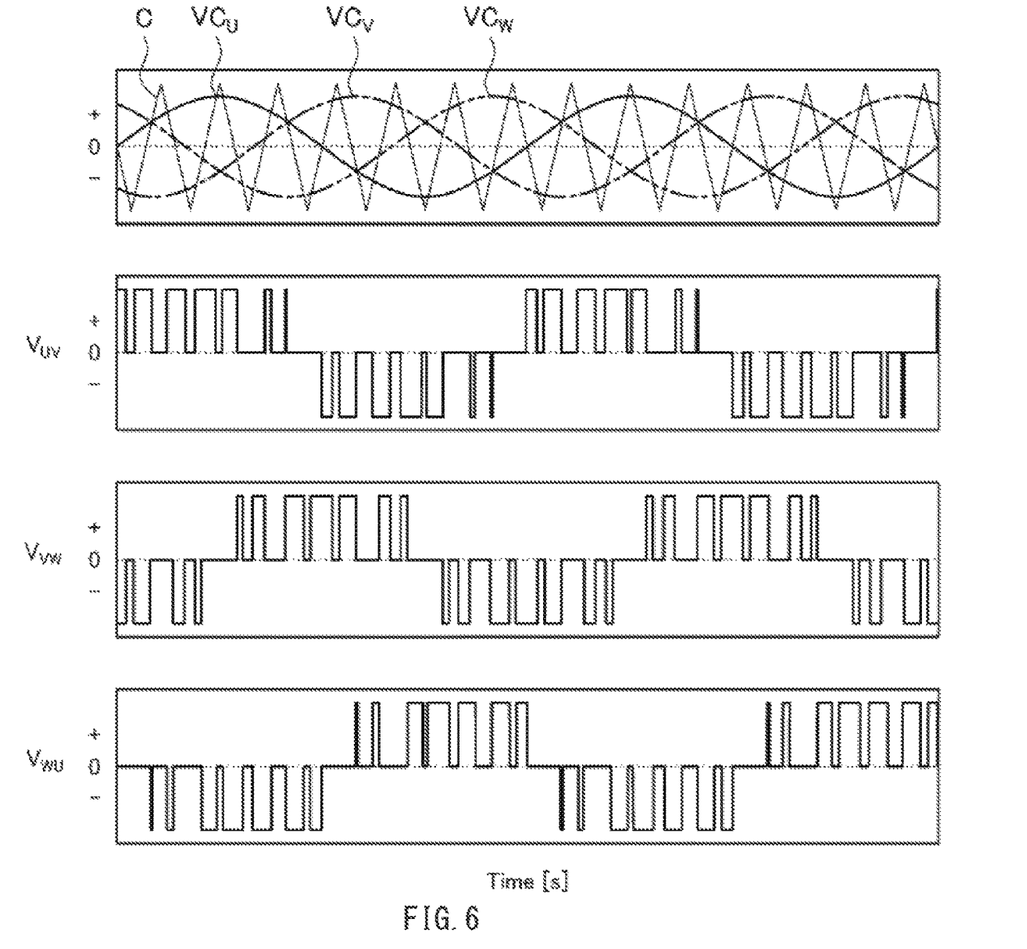
FIG. 6 illustrates a PWM signal that defines phase-to-phase voltages in a case where the number of pulses of the carrier signal of the inverter according to the embodiment of the disclosure is seven (7).

FIG. 6 illustrates a PWM signal defining the phase-to-phase voltages $V_{UV}$, $V_{VW}$, and $V_{WU}$ in a case where the number of pulses of the carrier signal C of the inverter 30 is seven (7). The example illustrated in FIG. 6 corresponds to an example where the number of pulses of the carrier signal C is changed to 7 from 6 in the example illustrated in FIG. 4. As illustrated in FIG. 6, the PWM signal defining the phase-to-phase voltages $V_{UV}$, $V_{VW}$, and $V_{WU}$ is different from the example illustrated in FIG. 4. It is to be noted that the method of determining the phase-to-phase voltages $V_{UV}$, $V_{VW}$, and $V_{WU}$ is similar to the example illustrated in FIG. 4.

Figure 7:
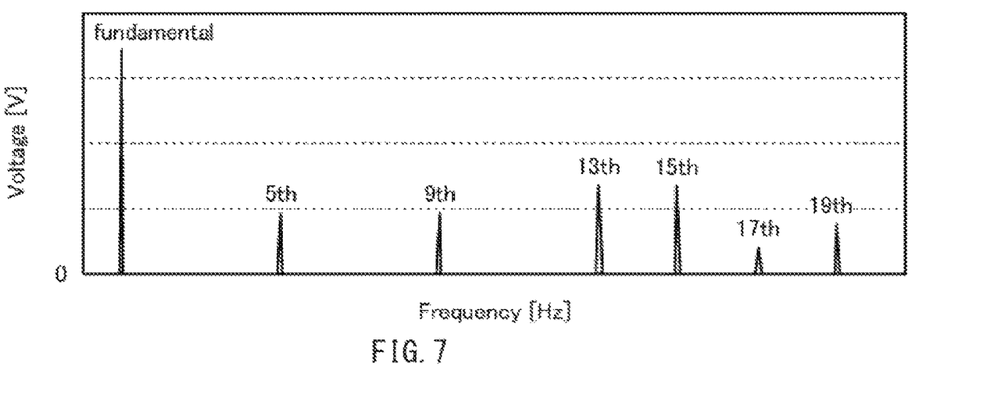
FIG. 7 illustrates harmonic components to be generated in the case where the number of pulses of the carrier signal of the inverter according to the embodiment of the disclosure is 7.

FIG. 7 illustrates harmonic components to be generated in the case where the number of pulses of the carrier signal C of the inverter 30 is 7. In one example, FIG. 7 illustrates harmonic components to be generated in accordance with the PWM signal illustrated in FIG. 6. As illustrated in FIG. 7, in the case where the number of pulses of the carrier signal C is 7, there occurs, in the voltage to be applied to the motor 20, in addition to the fundamental wave ("fundamental" in FIG. 7), a 5th harmonic component, a 9th harmonic component, a 13th harmonic component, a 15th harmonic component, a 17th harmonic component, and a 19th harmonic component.

Figure 8:
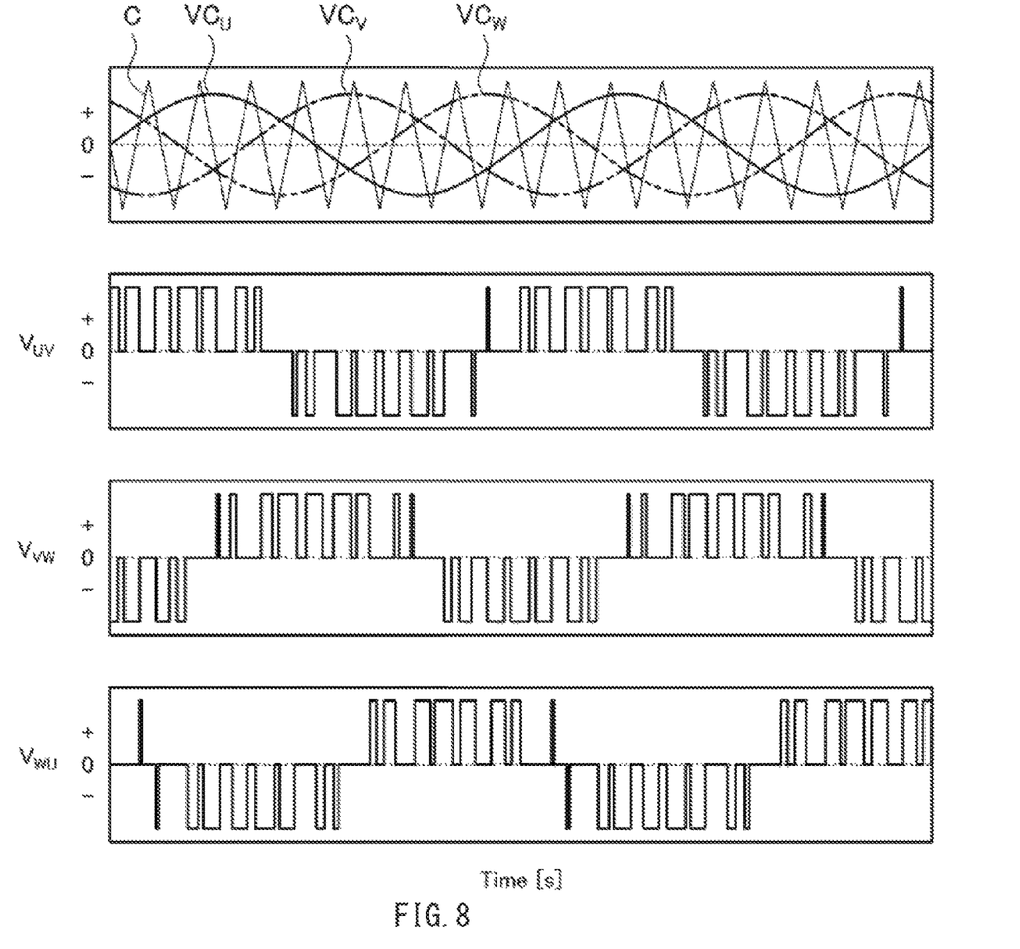
FIG. 8 illustrates a PWM signal that defines phase-to-phase voltages in a case where the number of pulses of the carrier signal of the inverter according to the embodiment of the disclosure is eight (8).

FIG. 8 illustrates a PWM signal defining the phase-to-phase voltages $V_{UV}$, $V_{VW}$, and $V_{WU}$ in a case where the number of pulses of the carrier signal C of the inverter 30 is eight (8). The example illustrated in FIG. 8 corresponds to an example where the number of pulses of the carrier signal C is changed to 8 from 6 in the example illustrated in FIG. 4. As illustrated in FIG. 8, the PWM signal defining the phase-to-phase voltages $V_{UV}$, $V_{VW}$, and $V_{WU}$ is different from the example illustrated in FIG. 4. It is to be noted that the method of determining the phase-to-phase voltages $V_{UV}$, $V_{VW}$, and $V_{WU}$ is similar to the example illustrated in FIG. 4.

Figure 9:
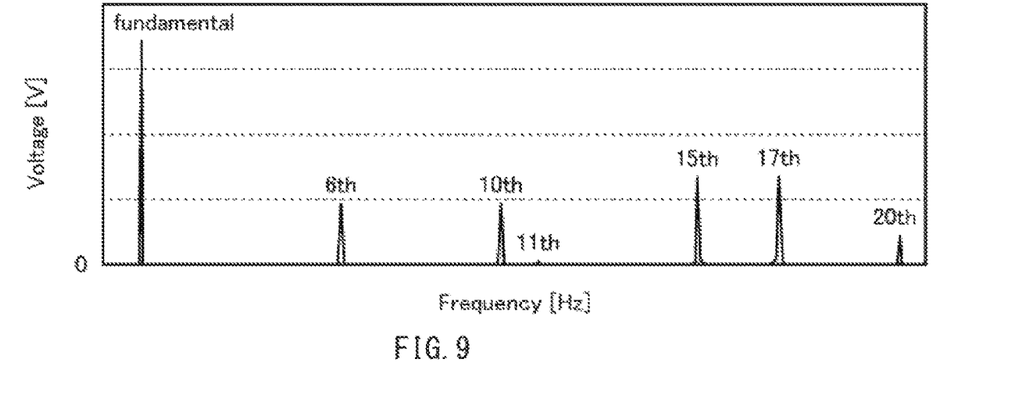
FIG. 9 illustrates harmonic components to be generated in the case where the number of pulses of the carrier signal of the inverter according to the embodiment of the disclosure is 8.

FIG. 9 illustrates harmonic components to be generated in the case where the number of pulses of the carrier signal C of the inverter 30 is 8. In one example, FIG. 9 illustrates harmonic components to be generated in accordance with the PWM signal illustrated in FIG. 8. As illustrated in FIG. 9, in the case where the number of pulses of the carrier signal C is 8, there occurs, in the voltage to be applied to the motor 20, in addition to the fundamental wave ("fundamental" in FIG. 9), a 6th harmonic component, a 10th harmonic component, an 11th harmonic component, a 15th harmonic component, a 17th harmonic component, and a 20th harmonic component.

Figure 10:
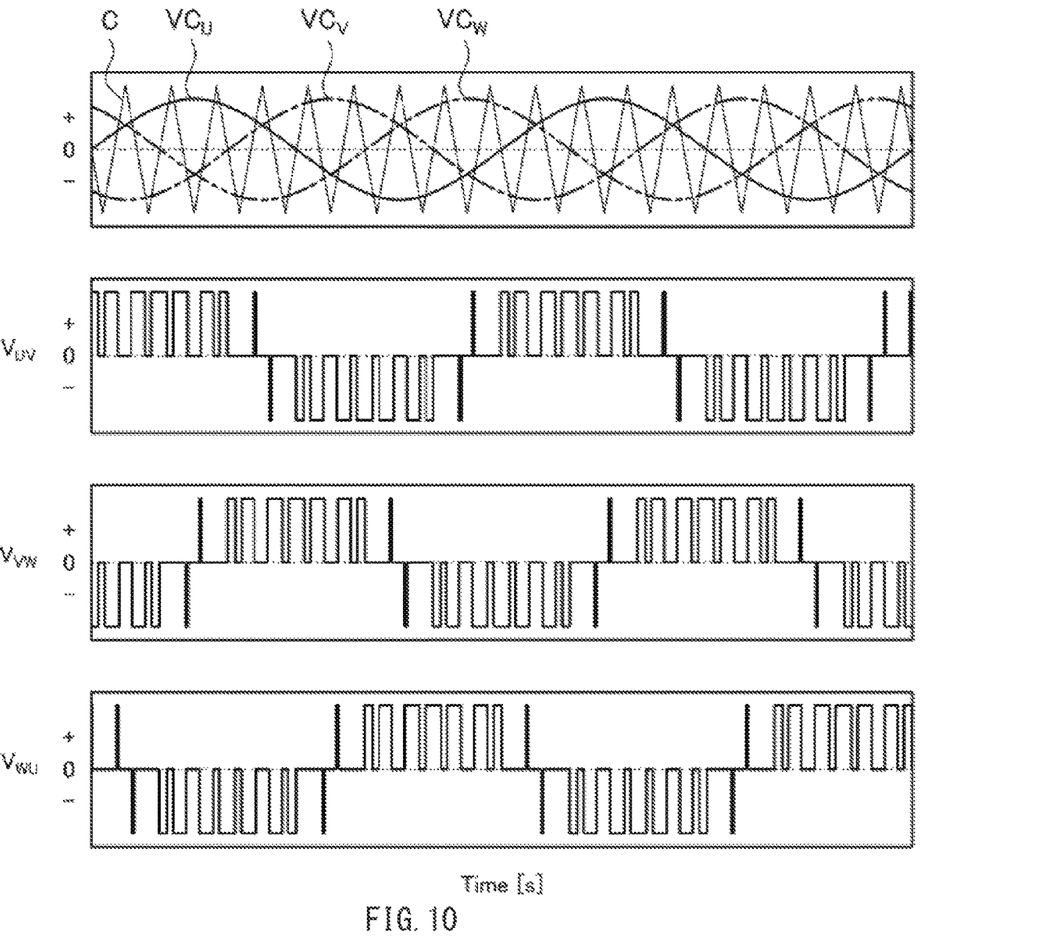
FIG. 10 illustrates a PWM signal that defines phase-to-phase voltages in a case where the number of pulses of the carrier signal of the inverter according to the embodiment of the disclosure is nine (9).

FIG. 10 illustrates a PWM signal defining the phase-to-phase voltages $V_{UV}$, $V_{VW}$, and $V_{WU}$ in a case where the number of pulses of the carrier signal C of the inverter 30 is nine (9). The example illustrated in FIG. 10 corresponds to an example where the number of pulses of the carrier signal C is changed to 9 from 6 in the example illustrated in FIG. 4. As illustrated in FIG. 10, the PWM signal defining the phase-to-phase voltages $V_{UV}$, $V_{VW}$, and $V_{WU}$ is different from the example illustrated in FIG. 4. It is to be noted that the method of determining the phase-to-phase voltages $V_{UV}$, $V_{VW}$, and $V_{WU}$ is similar to the example illustrated in FIG. 4.

Figure 11:
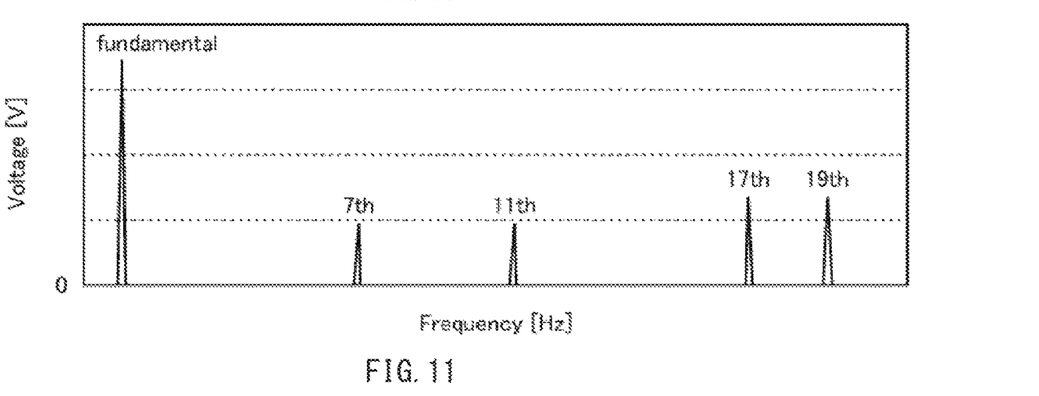
FIG. 11 illustrates harmonic components to be generated in the case where the number of pulses of the carrier signal of the inverter according to the embodiment of the disclosure is 9.

FIG. 11 illustrates harmonic components to be generated in the case where the number of pulses of the carrier signal C of the inverter 30 is 9. In one example, FIG. 11 illustrates harmonic components to be generated in accordance with the PWM signal illustrated in FIG. 10. As illustrated in FIG. 11, in the case where the number of pulses of the carrier signal C is 9, there occurs, in the voltage to be applied to the motor 20, in addition to the fundamental wave ("fundamental" in FIG. 11), a 7th harmonic component, an 11th harmonic component, a 17th harmonic component, and a 19th harmonic component.

As described, in a case where the number of pulses of the carrier signal C is an even number, a harmonic component of the order of an even ordinal number may be possibly generated. In contrast, in a case where the number of pulses of the carrier signal C is an odd number, no harmonic component of the order of an even ordinal number is generated. One reason for this may be as follows. In the case where the number of pulses of the carrier signal C is an odd number, the waveforms of the phase-to-phase voltages are in half-wave symmetry. That is, a positive portion and a negative portion are vertically symmetrical (see FIGS. 6 and 10).

For example, in the case where the number of pulses of the carrier signal C is 7 or 9, as illustrated in FIGS. 7 and 11, no harmonic component of the order of an even ordinal number is generated. In contrast, in the case where the number of pulses of the carrier signal C is 6, as illustrated in FIG. 5, the 4th harmonic component, the 8th harmonic component, the 14th harmonic component, the 16th harmonic component, and the 20th harmonic component are generated as harmonic components of the order of even ordinal numbers. Moreover, in the case where the number of pulses of the carrier signal C is 8, as illustrated in FIG. 9, the 6th harmonic component, the 10th harmonic component, and the 20th harmonic component are generated as harmonic components of the order of even ordinal numbers.

Moreover, as described, in a case where the number of pulses of the carrier signal C is a multiple of three (3), no harmonic component of the order of a multiple of 3 is generated. One reason for this may be as follows. In a case where the motor 20 is a three-phase AC motor, and the number of pulses of the carrier signal C is a multiple of 3, the waveforms of the phase-to-phase voltages have the same shape (see FIG. 10).

For example, in the case where the number of pulses of the carrier signal C is 9, as illustrated in FIG. 11, no harmonic component of the order of a multiple of 3 is generated. In contrast, in the case where the number of pulses of the carrier signal C is 7, as illustrated in FIG. 7, the 9th harmonic component and the 15th harmonic component are generated as harmonic components of the order of multiples of 3. Moreover, in the case where the number of pulses of the carrier signal C is 8, as illustrated in FIG. 9, the 6th harmonic component and the 15th harmonic component are generated as harmonic components of the order of multiples of 3.

Description is given below of details of the processing as to how the processor 82 controls the number of pulses of the carrier signal C.

In the synchronous PWM control, the processor 82 may use, in a normal case, the main number of pulses as the number of pulses of the carrier signal C. In a particular case, the processor 82 may use the sub-number of pulses as the number of pulses of the carrier signal C. The sub-number of pulses is different from the main number of pulses. In one example, in the synchronous PWM control, in a case where resonance is caused, in the circuit including the inverter 30, by a particular harmonic component (e.g., a harmonic component of the lower order) out of harmonic components to be generated in accordance with the PWM signal, the processor 82 is configured to change the number of pulses of the carrier signal C from the main number of pulses to the sub-number of pulses. For example, the processor 82 may change the number of pulses of the carrier signal C from the main number of pulses to the sub-number of pulses in a case where the motor 20 is driven at a particular speed. The particular speed as mentioned above is a speed at which resonance occurs in the circuit including the inverter 30, in a case with the number of pulses of the carrier signal C being the main number of pulses.

The smaller the number of harmonic components to be generated in accordance with the PWM signal, the smaller a loss caused by the generation of the harmonic components (e.g., a loss of signal transmission). Thus, in the case with the number of pulses of the carrier signal C being the main number of pulses, reducing the number of the harmonic components to be generated in accordance with the PWM signal leads to reduction in the loss of the signal transmission caused by the generation of the harmonic components. From this point of view, the main number of pulses may be set to an odd number. Moreover, from the similar point of view, the main number of pulses may be set to a multiple of 3. For example, out of the forgoing cases described with reference to FIGS. 4 to 11 with the number of pulses being 6, 7, 8, and 9, the main number of pulses may be set to 7 or 9 as an odd number. Furthermore, for example, the main number of pulses may be set to 9 as an odd number and a multiple of 3.

Description now moves on to an example of processing, with reference to FIGS. 12 to 15, in a case where the main number of pulses is set to 9 and the sub-number of pulses is set to 7. As described later, the setting of the main number of pulses and the sub-number of pulses is not particularly limited to this example. In the examples illustrated in FIGS. 12 to 15, the number of pole pairs of the motor 20 is four (4). That is, assuming that the frequency of the voltage command is f [Hz] and the motor speed is S [rpm], the following relation is established: f=S/60×4. It is to be noted that the number of pole pairs of the motor 20 may be other than 4.

Figure 12:
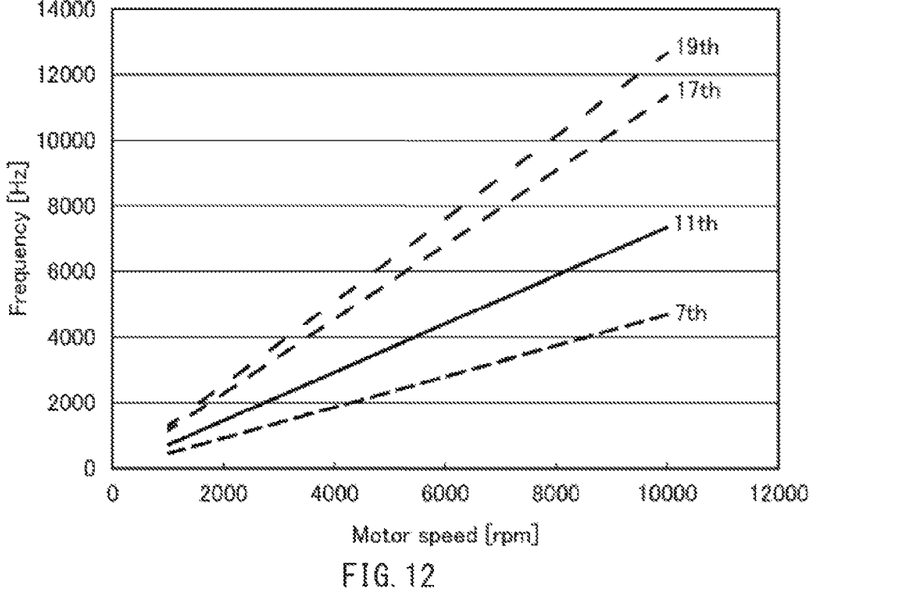
FIG. 12 illustrates relation of a motor speed and a frequency of each of the harmonic components in the case where the number of pulses of the carrier signal of the inverter according to the embodiment of the disclosure is 9.
Figure 13:
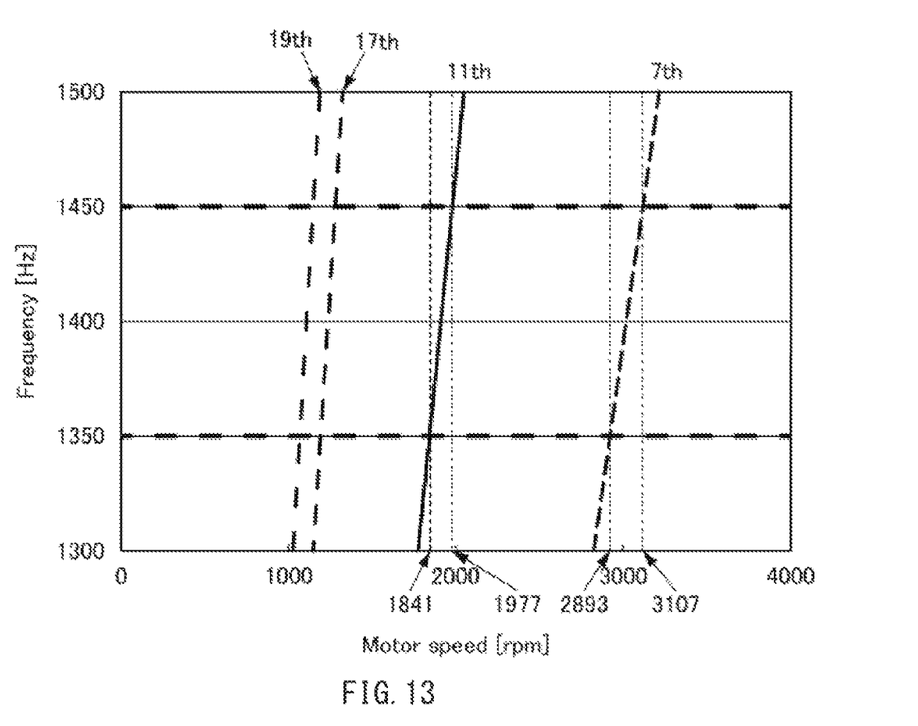
FIG. 13 is an enlarged diagram of a fragment of FIG. 12.

FIG. 12 illustrates relation of the motor speed and the frequency of each of the harmonic components in the case where the number of pulses of the carrier signal C of the inverter 30 is 9. FIG. 13 is an enlarged diagram of a fragment of FIG. 12. As illustrated in FIG. 12, in the case where the number of pulses of the carrier signal C is 9, i.e., in the case where the number of pulses of the carrier signal C is the main number of pulses, the 7th harmonic component, the 11th harmonic component, the 17th harmonic component, and the 19th harmonic component are generated as the harmonic components. Moreover, because the frequency of the voltage command varies in proportion to the motor speed, each of the harmonic components also varies in proportion to the motor speed.

For example, in a case where the motor speed is 3000 [rpm], the frequency of the voltage command is 200 [Hz]. The frequencies of the 7th harmonic component, the 11th harmonic component, the 17th harmonic component, and the 19th harmonic component are, respectively, 1400 [Hz], 2200 [Hz], 3400 [Hz], and 3800 [Hz]. In a case where the motor speed is 6000 [rpm], the frequency of the voltage command is 400 [Hz]. The frequencies of the 7th harmonic component, the 11th harmonic component, the 17th harmonic component, and the 19th harmonic component are, respectively, 2800 [Hz], 4400 [Hz], 6800 [Hz], and 7600 [Hz]. In a case where the motor speed is 9000 [rpm], the frequency of the voltage command is 600 [Hz]. The frequencies of the 7th harmonic component, the 11th harmonic component, the 17th harmonic component, and the 19th harmonic component are, respectively, 4200 [Hz], 6600 [Hz], 10200 [Hz], and 11400 [Hz].

Let us assume that a resonance frequency band of the circuit including the inverter 30 is 1350 to 1450 [Hz]. The resonance frequency band is a frequency band in which a resonance frequency may be possibly present. In this case, as illustrated in FIG. 13, when the motor speed is 1841 to 1977 [rpm], the frequency of the 11th harmonic component falls within the resonance frequency band, resulting in resonance in the circuit including the inverter 30. Moreover, when the motor speed is 2893 to 3107 [rpm], the frequency of the 7th harmonic component falls within the resonance frequency band, resulting in resonance in the circuit including the inverter 30.

Figure 14:
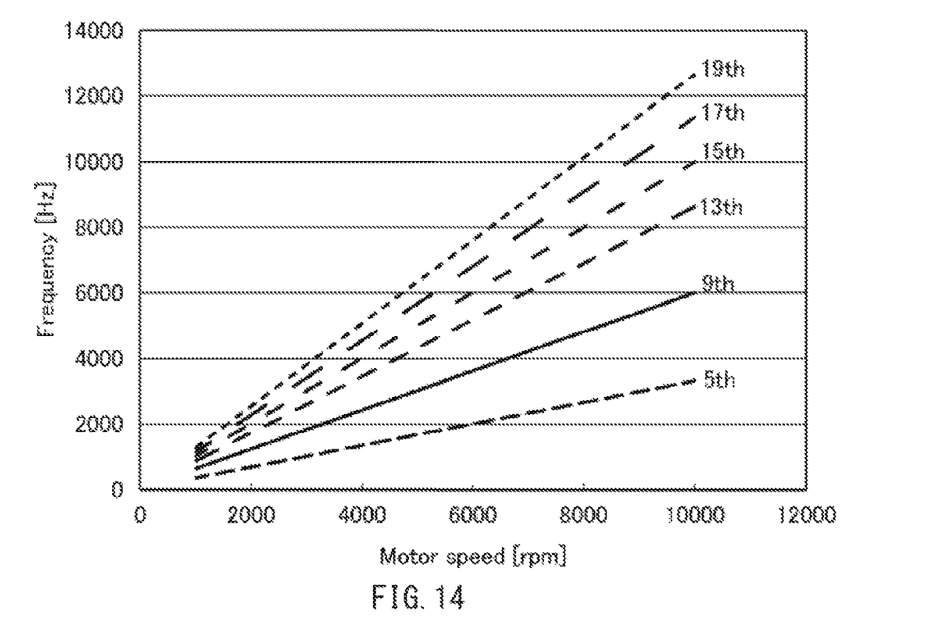
FIG. 14 illustrates the relation of the motor speed and the frequency of each of the harmonic components in the case where the number of pulses of the carrier signal of the inverter according to the embodiment of the disclosure is 7.
Figure 15:
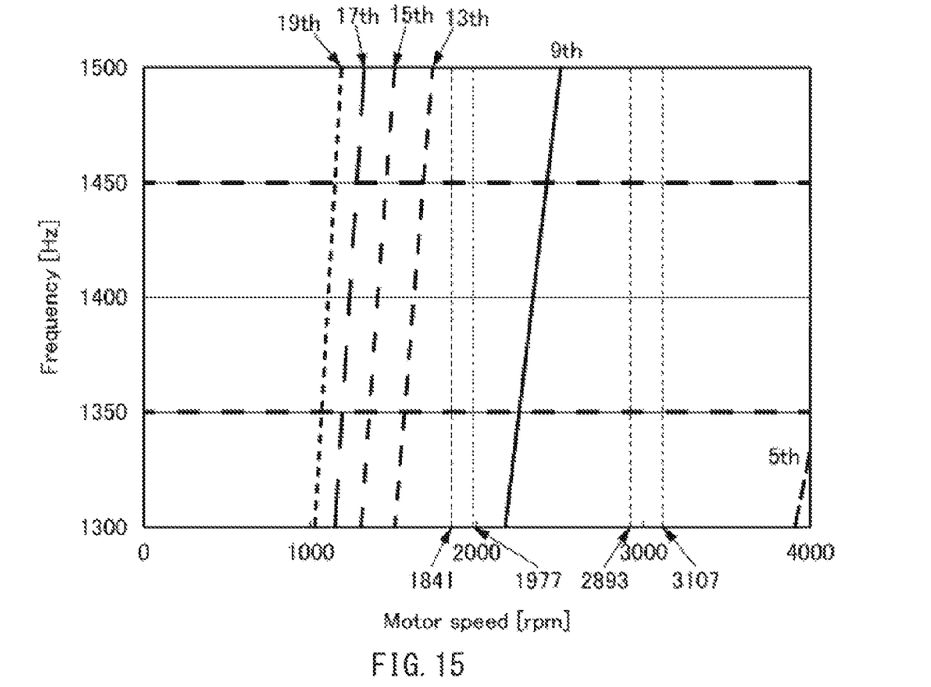
FIG. 15 is an enlarged diagram of a fragment of FIG. 14.

FIG. 14 illustrates relation of the motor speed and the frequency of each of the harmonic components in the case where the number of pulses of the carrier signal C of the inverter 30 is 7. FIG. 15 is an enlarged diagram of a fragment of FIG. 14. As illustrated in FIG. 14, in the case where the number of pulses of the carrier signal C is 7, i.e., in the case where the number of pulses of the carrier signal C is the sub-number of pulses, the 5th harmonic component, the 9th harmonic component, the 13th harmonic component, the 15th harmonic component, the 17th harmonic component, and the 19th harmonic component are generated as the harmonic components. Moreover, as with the example of FIG. 12, because the frequency of the voltage command varies in proportion to the motor speed, the frequency of each of the harmonic components also varies in proportion to the motor speed.

For example, in the case where the motor speed is 3000 [rpm], the frequency of the voltage command is 200 [Hz]. The frequencies of the 5th harmonic component, the 9th harmonic component, the 13th harmonic component, the 15th harmonic component, the 17th harmonic component, and the 19th harmonic component are, respectively, 1000 [Hz], 1800 [Hz], 2600 [Hz], 3000 [Hz], 3400 [Hz], and 3800 [Hz]. In the case where the motor speed is 6000 [rpm], the frequency of the voltage command is 400 [Hz]. The frequencies of the 5th harmonic component, the 9th harmonic component, the 13th harmonic component, the 15th harmonic component, the 17th harmonic component, and the 19th harmonic component are, respectively, 2000 [Hz], 3600 [Hz], 5200 [Hz], 6000 [Hz], 6800 [Hz], and 7600 [Hz]. In the case where the motor speed is 9000 [rpm], the frequency of the voltage command is 600 [Hz]. The frequencies of the 5th harmonic component, the 9th harmonic component, the 13th harmonic component, the 15th harmonic component, the 17th harmonic component, and the 19th harmonic component are, respectively, 3000 [Hz], 5400 [Hz], 7800 [Hz], 9000 [Hz], 10200 [Hz], and 11400 [Hz].

As illustrated in FIG. 15, in the case where the number of pulses of the carrier signal C is 7, unlike the case where the number of pulses of the carrier signal C is 9 (see FIG. 13), when the motor speed is 1841 to 1977 [rpm], and when the motor speed is 2893 to 3107 [rpm], no harmonic component is present that has a frequency falling within the resonance frequency band, i.e., a range of 1350 to 1450 [Hz].

As described above with reference to FIG. 13, in the case where the number of pulses of the carrier signal C is the main number of pulses, i.e., 9, when the motor speed is 1841 to 1977 [rpm] or 2893 to 3107 [rpm], resonance is caused, in the circuit including the inverter 30, by a particular harmonic component (e.g., the 7th harmonic component or the 11th harmonic component). In other words, it is the motor speed in a range of 1841 to 1977 [rpm] or 2893 to 3107 [rpm] that serves as the particular speed at which resonance occurs in the circuit including the inverter 30, with the number of pulses of the carrier signal C being the main number of pulses. Thus, the processor 82 changes the number of pulses of the carrier signal C from the main number of pulses to the sub-number of pulses, that is, from 9 to 7, in the case where the motor speed falls within the range of 1841 to 1977 [rpm] or 2893 to 3107 [rpm]. This leads to suppression of the generation of a harmonic component having a frequency falling within the resonance frequency band, making it possible to suppress the resonance in the circuit including the inverter 30. Hence, it is possible to suppress generation of vibration and noise caused by the resonance.

In the forgoing example, the processor 82 changes the number of pulses of the carrier signal C to the sub-number of pulses, i.e., 7, in the case with the resonance being generated by a harmonic component of the lower order (e.g., the 7th harmonic component or the 11th harmonic component), with the number of pulses of the carrier signal C being the main number of pulses, i.e., 9.

The processor 82 may, however, change the number of pulses of the carrier signal C to the sub-number of pulses, i.e., 7, in a case with the resonance being generated by a harmonic component of the higher order (e.g., the 17th harmonic component or the 19th harmonic component), with the number of pulses of the carrier signal C being the main number of pulses, i.e., 9. For example, the processor 82 may change the number of pulses of the carrier signal C to the sub-number of pulses, i.e., 7, in a case where the motor 20 is driven at a speed at which resonance is caused by the 17th harmonic component or the 19th harmonic component, with the number of pulses of the carrier signal C being the main number of pulses, i.e., 9.

However, the synchronous PWM control is performed in a case where the motor speed is higher than a predetermined speed. Accordingly, the resonance by the harmonic component of the higher order is hindered from occurring, as compared with the resonance by the harmonic component of the lower order. It is therefore more important to suppress the resonance by the harmonic component of the lower order than to suppress the resonance by the harmonic component of the higher order.

In the forgoing, described is the processing example in the case where the main number of pulses is set to 9 and the sub-number of pulses is set to 7, but the setting of the main number of pulses and the sub-number of pulses is not particularly limited to this example. For example, the main number of pulses may be switched in accordance with, for example, the motor speed. Moreover, for example, in the case where the main number of pulses is set to 9, the sub-number of pulses may be set to the number of pulses other than 7. The sub-number of pulses is, however, set to prevent presence of any harmonic component having a frequency within the resonance frequency band, when the number of pulses of the carrier signal C is changed from the main number of pulses to the sub-number of pulses in the particular case described above.

The change in the number of pulses of the carrier signal C may be possibly accompanied by an excessively great change in a switching sound of the inverter 30 or transient current disturbance of the inverter 30. From the viewpoint of suppression of such a change in the switching sound of the inverter 30 or the transient current disturbance of the inverter 30, in setting the sub-number of pulses, whichever number of pulses is closer to the main number of pulses may be given priority over whichever number of pulses is more distant from the main number of pulses.

Furthermore, as described above, in the case where the number of pulses of the carrier signal C is an even number, a harmonic component of the order of an even ordinal number may be possibly generated. Thus, in setting the sub-number of pulses, an odd number may be given priority over an even number, from the viewpoint of suppression of the loss in the signal transmission caused by the generation of harmonic components, with the number of pulses of the carrier signal C being set to the sub-number of pulses.

In addition, the greater the number of pulses of the carrier signal C, the more frequently the switching elements of the inverter 30 is driven, causing an increase in a switching loss. Thus, in setting the sub-number of pulses, whichever number of pulses is lower than the main number of pulses may be given priority over whichever number of pulses is higher than the main number of pulses, from the viewpoint of reduction in the switching loss, with the number of pulses of the carrier signal C being the sub-number of pulses.

In setting the sub-number of pulses, the order of priority may be set in consideration of any combination of the forgoing viewpoints. For example, priority may be given to the following number of pulses, in the order named: whichever number of pulses is closest to the main number of pulses, out of the number of pulses being odd and smaller than the main number of pulses (hereinafter, the first number of pulses); whichever number of pulses is closest to the main number of pulses, out of the number of pulses being odd and greater than the main number of pulses (hereinafter, the second number of pulses); whichever number of pulses is closest to the main number of pulses, out of the number of pulses being even and smaller than the main number of pulses (hereinafter, the third number of pulses); and whichever number of pulses is closest to the main number of pulses, out of the number of pulses being even and greater than the main number of pulses (hereinafter, the fourth number of pulses). In the case where the main number of pulses is set to 9, the first number of pulses is 7, the second number of pulses is 11, the third number of pulses is 8, and the fourth number of pulses is 10.

The number of pulses of the carrier signal C, i.e., the main number of pulses and the sub-number of pulses, may be actually set in consideration of various kinds of other viewpoints than the viewpoints described above. For example, on the occasion that the inverter 30 is driven, an inverter sound arises from the inverter 30. The inverter sound includes a carrier frequency, i.e., the frequency of the carrier signal C, as its main component. Accordingly, in practice, the number of pulses of the carrier signal C is set to allow the inverter sound to avoid easily audible frequencies to humans, i.e., frequencies that are easily felt as noise. From this viewpoint, the number of pulses of the carrier signal C may be set in additional consideration of positional relation of a mounting position of components such as the inverter 30 and the motor 20 to an occupant (e.g., a driver). Moreover, for example, the number of pulses of the carrier signal C is set to allow for stable switching operation of the inverter 30. This leads to suppression of a distorted current waveform, unstable circuit operation, and a loss caused by current pulsation.

<Effects of Control Device>

Described next are effects of the control device 80 according to the embodiments of the disclosure.

In the control device 80 according to this embodiment, in the synchronous PWM control, in the case where resonance is caused, in the circuit including the inverter 30, by the particular harmonic component out of the harmonic components to be generated in accordance with the PWM signal, the processor 82 is configured to change the number of pulses of the carrier signal C in one cycle of the voltage command, from the main number of pulses to the sub-number of pulses. This leads to the suppression of the generation of a harmonic component having a frequency falling within the resonance frequency band of the circuit including the inverter 30. Accordingly, it is possible to suppress the resonance in the circuit including the inverter 30. Hence, it is possible to suppress the generation of vibration and noise due to the resonance.

Moreover, in the control device 80 according to this embodiment, in the case where the motor 20 is driven at the speed at which resonance occurs, with the number of pulses of the carrier signal C being the main number of pulses, the processor 82 may change the number of pulses of the carrier signal C from the main number of pulses to the sub-number of pulses. As described above, the change in the motor speed is accompanied by the change in the frequency of the harmonic component. Thus, changing the number of pulses of the carrier signal C in accordance with the motor speed as described above makes it possible to appropriately suppress the generation of a harmonic component having a frequency falling within the resonance frequency band of the circuit including the inverter 30. Hence, it is possible to appropriately suppress the resonance in the circuit including the inverter 30.

Furthermore, in the control device 80 according to this embodiment, in setting the sub-number of pulses, whichever number of pulses is closer to the main number of pulses may be given priority over whichever number of pulses is more distant from the main number of pulses. This makes it possible to reduce a degree of change in the number of pulses of the carrier signal C on the occasion that the number of pulses of the carrier signal C is changed from the main number of pulses to the sub-number of pulses. Accordingly, it is possible to suppress the excessively great change in the switching sound of the inverter 30 and the transient current disturbance of the inverter 30, in accompaniment with the change in the number of pulses of the carrier signal C. This leads to alleviation of the sense of discomfort given to the driver.

Furthermore, in the control device 80 according to this embodiment, in setting the sub-number of pulses, an odd number may be given priority over an even number. As described, in the case where the number of pulses of the carrier signal C is an even number, a harmonic component of the order of an even ordinal number may be possibly generated. In contrast, in the case where the number of pulses of the carrier signal C is an odd number, no harmonic component of the order of an even ordinal number is generated. Accordingly, in setting the sub-number of pulses, giving priority to an odd number makes it possible to reduce the number of harmonic components to be generated in accordance with the PWM signal, with the number of pulses of the carrier signal C being the sub-number of pulses. Hence, it is possible to reduce the loss of the signal transmission caused by the generation of the harmonic components, with the number of pulses of the carrier signal C being the sub-number of pulses.

In addition, in the control device 80 according to this embodiment, the main number of pulses may be set to an odd number. This makes it possible to suppress the generation of a harmonic component of the order of an even ordinal number, with the number of pulses of the carrier signal C being the main number of pulses. Hence, it is possible to reduce the number of harmonic components to be generated in accordance with the PWM signal, with the number of pulses of the carrier signal C being the main number of pulses. This leads to reduction in the loss of the signal transmission caused by the generation of the harmonic components.

Although some preferred embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

For example, in the forgoing, the configuration of the vehicle 1 is described with reference to FIG. 1, but the configuration of the vehicle on which the control device 80 is mounted is not limited to such a configuration. The vehicle on which the control device 80 is mounted may have a configuration in which some constituent elements are removed from, added to, or changed from those of the vehicle 1 illustrated in FIG. 1. For example, the vehicle on which the control device 80 is mounted may be a vehicle in which the position of the motor 20 is changed from that of the vehicle 1 illustrated in FIG. 1, to allow the motor 20 to be coupled to output side of the power transmission system 50. Moreover, the vehicle on which the control device 80 is mounted may be an electric vehicle in which the engine 10 is removed from the configuration of the vehicle 1 illustrated in FIG. 1. Furthermore, the vehicle on which the control device 80 is mounted may be a vehicle in which, for example, a motor is provided in association with each wheel, i.e., a vehicle including four motors. In addition, as mentioned above, an apparatus on which the control device 80 is mounted may be other apparatuses than vehicles, e.g., moving bodies such as vessels, or power generation equipment.

Moreover, in the forgoing, an example is described in which the operation of the inverter 30 is controlled by the control device 80. The inverter 30 controls electric power to be supplied to the motor 20. The motor 20 may serve as a driving motor that outputs motive power that drives the drive wheels 60. However, the inverter to be controlled by the control device 80 may be an inverter that controls electric power to be supplied to a motor of other applications than the driving motor, e.g., a motor for power generation.

The control device 80 illustrated in FIGS. 1 and 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control device 80. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control device 80 illustrated in FIGS. 1 and 3.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:
1. A control device comprising
a processor configured to control operation of an inverter by a synchronous pulse width modulation control using a pulse width modulation signal, the inverter being coupled to a motor, and the pulse width modulation signal being generated by comparison of a carrier signal and a voltage command, wherein:
the processor is configured to:
when a motor speed of the motor is outside of a predetermined speed range, set a number of pulses of the carrier signal in one cycle of the voltage command to a main number of pulses; and
when the motor speed is in the predetermined speed range, set the number of pulses of the carrier signal in one cycle of the voltage command to a sub number of pulses which is an odd number and smaller than the main number of pulses,
the predetermined speed range is a speed range of the motor in which i) a harmonic component having a predetermined frequency band is generated when the motor is driven by the inverter under the synchronous pulse width modulation control with the number of pulses of the carrier signal in one cycle of the voltage command is the main number of pulses and ii) the harmonic component having the predetermined frequency band is not generated when the motor is driven by the inverter under the synchronous pulse width modulation control with the number of pulses of the carrier signal in one cycle of the voltage command is the sub number of pulses, and
the predetermined frequency band is a frequency band in which resonance of a circuit including the inverter occurs due to the harmonic component having the predetermined frequency band.
2. The control device according to claim 1, wherein
in setting the sub-number of pulses, whichever number of pulses is closer to the main number of pulses is given priority over whichever number of pulses is more distant from the main number of pulses.
3. A control device comprising
circuitry configured to control operation of an inverter by a synchronous pulse width modulation control using a pulse width modulation signal, the inverter being coupled to a motor, and the pulse width modulation signal being generated by comparison of a carrier signal and a voltage command, wherein;
the circuitry is configured to:
when a motor speed of the motor is outside of a predetermined speed range, set a number of pulses of the carrier signal in one cycle of the voltage command to a main number of pulses; and
when the motor speed is in the predetermined speed range, set the number of pulses of the carrier signal in one cycle of the voltage command to a sub number of pulses which is an odd number and smaller than the main number of pulses, the predetermined speed range is a speed range of the motor in which i) a harmonic component having a predetermined frequency band is generated when the motor is driven by the inverter under the synchronous pulse width modulation control with the number of pulses of the carrier signal in one cycle of the voltage command is the main number of pulses and ii) the harmonic component having the predetermined frequency band is not generated when the motor is driven by the inverter under the synchronous pulse width modulation control with the number of pulses of the carrier signal in one cycle of the voltage command is the sub number of pulses, and the predetermined frequency band is a frequency band in which resonance of a circuit including the inverter occurs due to the harmonic component having the predetermined frequency band.

* * * * *